United States Patent [19]

Brunelle et al.

[11] Patent Number: 4,722,995

[45] Date of Patent: Feb. 2, 1988

[54] DETECTING THE STOICHIOMETRIC END POINT OF PHOSGENATION REACTIONS

[75] Inventors: Daniel J. Brunelle, Scotia; Thomas G. Shannon; Philip G. Kosky, both of Schenectady; Paul W. Buckley, Scotia; James M. Silva, Clifton Park, all of N.Y.

[73] Assignee: General Electric Company, Schenectady, N.Y.

[21] Appl. No.: 855,975

[22] Filed: Apr. 25, 1986

[51] Int. Cl.$^4$ .............................................. C08G 63/62
[52] U.S. Cl. ...................................... 528/198; 526/59; 526/61; 528/196; 558/280; 558/281; 558/282; 558/283

[58] Field of Search .................. 528/196, 198; 526/59, 526/61; 558/280, 281, 282, 283

[56] References Cited

U.S. PATENT DOCUMENTS 4,378,454 3/1983 Dick et al. ............................ 526/59
4,506,067 3/1985 Burzminski ........................... 526/59

*Primary Examiner*—Harold D. Anderson
*Attorney, Agent, or Firm*—William A. Teoli; James C. Davis, Jr.; James Magee, Jr.

[57] ABSTRACT

A method is provided for determining the stoichiometric end point of phosgenation reactions which produce polycarbonates and chloroformates, respectively, by monitoring the rate of heat generated by the reaction mixture per unit of phosgene utilized.

13 Claims, No Drawings

DETECTING THE STOICHIOMETRIC END POINT OF PHOSGENATION REACTIONS

BACKGROUND OF THE INVENTION

This invention relates to a method for determining the stoichiometric end point of phosgenation reactions for producing polycarbonates and chloroformates. More particularly, it relates to methods for detecting the increase in the rate of heat generated at about the stoichiometric end point of reactions between phosgene and organo-hydroxy compounds.

Both polycarbonates and chloroformates are known classes of organic compounds. Polycarbonate polymers are known for their good engineering properties and inherent flame resistance. They can be obtained by reaction of aromatic dihydroxy compounds, such as bisphenol A, with phosgene. A polycarbonate for the purposes of this invention is any polymer having carbonate groups prepared from the use of phosgene. An aromatic polycarbonate has at least some of the carbonate groups attached to an aromatic nucleus. The chloroformates, in particular, oligomeric carbonate chloroformate mixtures, are prepared from phosgene and organo-hydroxy compounds. Mixtures of bischloroformate oligomers of formula I and monochloroformate oligomers of formula II are made from dihydroxy compounds

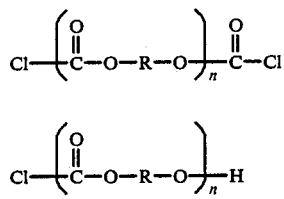

wherein R is a divalent aliphatic, alicyclic or aromatic radical and n is at least 1 and the number average for n is preferably less than 3. The reaction is similar to polycarbonate synthesis; however, a polycondensation catalyst is not used. Chloroformates have been shown to be useful as intermediates in the preparation of cyclic carbonate oligomers which may be converted to very high molecular weight polycarbonates as disclosed in copending application Ser. No. 704,122, filed Feb. 22, 1985, now U.S. Pat. No. 4,644,053, assigned to the same assignee as the present invention.

There are a number of known methods for preparing chloroformates and polycarbonates by reaction with phosgene. Each reaction is normally conducted interfacially; that is, in a mixed aqueous-organic system which results in the recovery of the product in the organic phase. For detailed descriptions of phosgenation reactions which provide polycarbonates, reference is made to the following U.S. Pat. Nos. 3,155,683, 3,274,214, 3,386,954, 3,422,119, 4,129,574, 4,216,305, 4,197,394, 4,360,659, 4,224,434 and to the procedures described in Encyclopedia of Polymer Science and Technology, *Polycarbonates* (1969), Vol. 10, pp. 710–764, Interscience Publishing. For a detailed description of chloroformate synthesis, reference is made to U.S. Pat. Nos. 3,312,661, 3,959,335, 3,974,126 and 3,966,785, which prepare bischloroformate compositions by reacting a water soluble salt of an alkylidene diphenol with phosgene in an aqueous system employing an organic diluent.

Although the preparation of aromatic polycarbonates and chloroformates with phosgene is well known, until recently a substantial excess of the calculated stoichiometric amount of phosgene was added to the reaction vessel to insure that all the initially added organo-hydroxy compound started with would react.

U.S. Pat. Nos. 4,378,454, issued Mar. 29, 1983, discloses a method for determining the end point of the polycarbonate polymerization reaction. This method is based on the known solubility of phosgene in the organic solvent utilized. The solubilized phosgene reacts immediately with the bisphenol and, since there is insufficient bisphenol, once the stoichiometric end point is reached the additional solubilized phosgene can be detected by a phosgene color test, described more particularly in U.S. Pat. No. 4,378,454.

In U.S. Pat. No. 4,506,067, a method is described wherein the stoichiometric end point of the preparation of aromatic polycarbonate resin with phosgene is determined by the increase in phosgene gas occurring in the vapor phase of the reactor.

It has now been discovered that at or slightly after the time the end point of the aromatic polycarbonate or chloroformate preparation has been reached, there is a substantial increase in the rate of heat generated by the reaction mixture per unit of phosgene utilized. This increase in heat generation can be detected by any standard means and will signal the end point of the desired reaction. Phosgene addition can then be terminated, thereby saving the extra phosgene which would have been added to insure the achievement of the reaction end point. Reducing the amount of phosgene also reduces the amount of time for each reaction, whether batch or continuous, thus increasing the effective capacity of present plant equipment.

DESCRIPTION OF THE INVENTION

In accordance with the invention there is a method for detecting the stoichiometric end point of a reaction between phosgene and an organo-hydroxy compound in a reaction mixture which contains an aqueous solution of alkali metal hydroxide or an alkaline earth hydroxide and an organic solvent solution in which phosgene is normally soluble. This method comprises detecting the increase in the rate of heat generated by the reaction mixture at about the stoichiometric end point of reaction.

Although this invention can be used for reactions between phosgene and a wide variety of organo-hydroxy compounds, it is particularly useful in processes which produce aromatic polycarbonates and mixtures of oligomeric carbonate chloroformates. These well known reactions can be carried out under standard conditions normally applicable, such as atmospheric pressure and a temperature of about 10° to 40° C.

Not being bound by theory, it is believed the increase in the rate of heat generated by the reaction mixture is due to the increase in hydrolysis of phosgene at about the stoichiometric end point of the reaction between phosgene and organo-hydroxy compounds. Hydrolysis of phosgene takes place in the presence of alkali metal hydroxide or an alkaline earth hydroxide, as illustrated by equations 1 and 2, respectively $$COCl_2 + 4XOH \rightarrow X_2CO_3 + 2XCl + 2H_2O \qquad 1$$

$$COCl_2 + 2Y(OH)_2 \rightarrow YCO_3 + YCL_2 + 2H_2O \qquad 2$$

wherein X is an alkali metal such as sodium, potassium, lithium and cesium and Y is an alkaline earth metal such as calcium. The heat of reaction for the hydrolysis of phosgene by excess aqueous NaOH in solution is about $-104$ kcal/mole $COCl_2$, which is higher than the heat generated from the reactions of phosgene and organo-hydroxy compounds. In the production of phenyl-chloroformate from phenol and phosgene, the heat of reaction is substantially less than the heat generated by the hydrolysis reaction.

In synthesizing polycarbonate from a medium containing water using phosgene gas, the formation of the carbonate linkage may be expected to produce a quantity of heat approximately equal to that generated by the synthesis of diphenylcarbonate via equation 3.

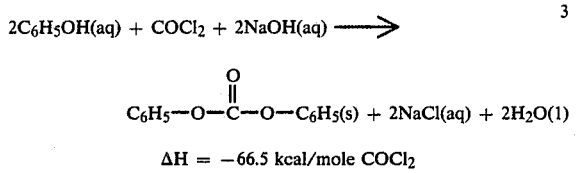

$$\Delta H = -66.5 \text{ kcal/mole } COCl_2$$

which is also substantially less than the heat generated by the corresponding hydrolysis reaction.

To provide a rapid increase in the rate of heat generated by the reaction mixture, a hydrolysis medium must be present, i.e., an aqueous solution of an alkali metal hydroxide (or alkaline earth metal hydroxide) must form part of the reaction mixture. The preferred alkali metal hydroxide is NaOH. The preferred alkaline earth metal hydroxide is $Ca(OH)_2$. To avoid complete hydrolysis of the phosgene introduced to the reaction mixture, an organic solvent solution in which phosgene is soluble must be present. Organic solvents which can be utilized include the halogenated organics such as methylene chloride, chloroform, carbon tetrachloride, trichloroethylene, ethylene dichloride, chlorobenzene and the like, hydrocarbon solvents including benzene, toluene and the like as well as heteroatom containing solvents such as pyridine, lutidine, dimethyl sulfoxide, tetrahydrofuran, dioxane, dimethylformamide, nitrobenzene and the like. Methylene chloride is the preferred solvent.

These two liquid components are generally immiscible and the reaction mixture is two phases, an aqueous phase that contains the alkali metal hydroxide and some organo-hydroxy compound and an organic phase which contains phosgene and the product formed. Additional organo-hydroxy compound may be present as a solid. The reaction takes place at the interface of these two liquid phases. The type and quantity of organic solvent employed usually solubilizes all the product; however, significant quantities of the product may be insoluble in the solvent. Extra quantities of organic solvent can be used but in general are unnecessary and merely add to the cost of carrying out the process.

For polycarbonate synthesis, a polycondensation catalyst is used and typically is present in the organic phase. This polycondensation catalyst can be any hydrogen halide acceptor commonly employed in interfacial polycondensation reactions. Illustrative of well-known catalysts are the following; trimethylamine, triethylamine, allyldiethylamine, benzyl dimethylamines, dimethylphenethylamine, N-methylpiperidine and the like.

Any amount of polycondensation catalyst can be employed. However, generally, effective mole proportions relative to the organo-hydroxy compound are within the range of from about 0.25% to about 2% per mole.

The organo-hydroxy compounds which can be utilized in this invention are hydroxy substituted organic compounds of formula III $$R^2(OH)_x \qquad \qquad III$$

wherein $R^2$ is an aliphatic, alicyclic or aromatic radical and x is at least 1. The sole reactive groups on these compounds must be the hydroxyl radicals which provide reactive terminal protons. The organo-hydroxy compounds defined by formula III are generally useful in chloroformate synthesis. Suitable $R^2$ values for chloroformate synthesis when x is 1 are 1-butyl, 2-butyl, 1-hexyl, cyclohexyl and phenyl. Where x is 2 and $R^2$ is a divalent aliphatic or alicyclic radical, illustrative values for $R^2$ include ethylene, propylene, trimethylene, tetramethylene, hexamethylene, dodecamethylene, poly-1,4-(2-butenylene) 1,3-cyclopentylene, 1,3-cyclohexylene and 1,4-cyclohexylene, including substituted derivatives thereof. Illustrative inert substituents include alkyl, cycloalkyl, halo and nitro.

The organo-hydroxy compounds of formula III which are dihydric phenols, i.e., where x is 2 and $R^2$ is a divalent aromatic radical, are particularly suitable for both chloroformate and polycarbonate synthesis. Some of these are represented by the formula

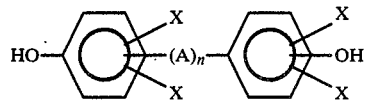

wherein A is a divalent hydrocarbon radical containing 1–15 carbon atoms, or

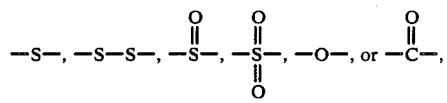

X is independently hydrogen, chlorine, bromine, fluorine, or a monovalent hydrocarbon radical such as an alkyl group of 1-4 carbons, or an aryl group of 6-8 carbons such as phenyl, tolyl, xylyl and n is 0 to 1.

One group of such dihydric phenols are those illustrated below:
1,1-bis(4-hydroxyphenyl)butane
1,1-bis(4-hydroxyphenyl)isobutane
1,1-bis(4-hydroxylphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
4,4'-dihydroxy-diphenyl-2-chlorophenyl methane
4,4'-dihydroxy-diphenyl-2,4-dichlorophenyl methane
4,4'-dihydroxy-diphenyl-p-isopropylphenyl methane 4,4'-dihydroxy-diphenylnaphthyl methane
4,4'-dihydroxy-3-methyl-diphenyl-2,2-propane
4,4'-dihydroxy-3-cyclohexyl-diphenyl-2,2-propane
4,4'-dihydroxy-3-methoxy-diphenyl-2,2-propane
4,4'-dihydroxy-3-isopropyl-diphenyl-2,2-propane
4,4'-dihydroxy-3,3'-dimethyl-diphenyl-2,2-propane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4-hydroxyphenyl)propane(Bisphenol A)
1,1-bis(3-methyl-4-hydroxyphenyl)ethane
1,1-bis(4-hydroxyphenyl)methane
6,6'-dihydroxy-3,3,3', 3'-tetra-1,1'-spirobiindane
1-(4-hydroxyphenyl)-1,3,3-trimethyl-6-indanol.

Another group of dihydric phenols useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxyaryl sulfones such as, for example:
bis(3,5-diisopropyl-4-hydroxyphenyl)sulfone
bis(3,5-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls
3,3', 5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether.

It is, of course, possible to employ a mixture of two or more different dihydric phenols or a mixture of a dihydric phenol and an aliphatic alcohol in the reactions of the invention. It is also possible to employ two or more different dihydric phenols or a copolymer of a dihydric phenol with a glycol or with a hydroxy-terminated polyester.

The increase in the rate of heat released by the reaction mixture has been found to be sufficient to provide an adequate signal for the end point of the reaction.

Any means for detecting an increase in heat generated per unit of phosgene is suitable for use in this invention. These means may vary with the reaction conditions and the system utilized. It is preferable to maintain the delivery rate of phosgene to the reaction mixture at a constant value to avoid an increase in heat generation by an increase in the rate of reaction.

Where the reaction mixture is below the reflux temperature, the increase in the rate of heat generated per unit of phosgene can be determined by monitoring the temperature of the reaction mixture. The increase in heat generation will be reflected by a temperature rise. This temperature rise can be detected by conventional means such as a thermocouple.

Where the reaction mixture is at reflux, the temperature is constant and the increase in heat generated per unit of phosgene can be determined by monitoring the solvent vaporization rate. Any method for monitoring the increase in vaporization is suitable. Where a condenser is utilized to return the vapors to the reaction mixture, the velocity of the vapors through the condenser can be measured by monitoring the pressure.

Alternatively, the position of the vapor/condensate interface in the condenser can be monitored. In the process of this invention, the gas is carbon dioxide, produced by hydrolysis of chloroformates or of phosgene, and the vapor is the uncondensed solvent, e.g., methylene chloride. Since the vapor is denser than the gas, a stable interfacial region is formed within the condenser, the position of which is dependent on the total rate of vapor to be condensed. The greater the amount of vapor, the greater the total area of the dondenser required to condense it. Thus, in the usual case of a vertical condenser, additional refluxing vapor from additional heat generated near endpoint reactions forces the interface to advance up in the condenser tubes. A rise in height of this interface corresponds to an increase in vaporization rate. This phenomenon is described more particularly by Kosky and Jaster in the *Journal of Electrostatics*, Vol. 6 (1979), pp. 107–119, Elsevier Publishing Co., The Netherlands. This interface can be monitored visually in glass equipment or by detecting the temperature difference between the gas filled portions and the vapor filled portions of the condenser. The position of this interfacial region can be detected by appropriately situated thermocouples or by a 2-junction null detecting thermocouple strategically placed to monitor the passage of the interfacial zone as it passes the upper junction.

Another method for detecting the increase in vaporization where a condenser is utilized is to monitor the increase in temperature of the coolant for the condenser. This requires sensitive equipment since the temperature increase may be slight where large volumes of coolant are used.

Where the reaction mixture is at reflux and contains two or more vaporizable components having different vaporization temperatures, the reaction mixture is not in a steady state where one or more of these components escapes the system. Under such conditions, there is a change in the composition of the reaction mixture and vapors as the reaction proceeds. This causes a change in the temperature for the reaction mixture and the temperature of the vapors and reaction mixture will increase. This increase in temperature can be monitored to determine the end point of the reaction.

The additional vaporizable component within organic solvent solution must be inert. Examples of suitable inert vaporizable components are inert fluorocarbon refrigerants having a boiling point in the range of about $-10°$ C. to $30°$ C. These include halogenated fluorocarbons such as $CCl_3F$, $CHCl_2F$, $CClF_2—CClF_2$, $CCl_2F—CF_3$, $CH_2Cl—CF_3$, $CH_3—CClF_2$, $CBrClF_2$, $CF_2I—CF_3$, $CHClF—CClF_2$, and the like, prefluorinated carbon compounds of from 4 to 5 carbon atoms and fluorinated ethers of from 2 to 4 carbon atoms; examples of which include n-perfluorobutane, perfluoroisobutane, cyclic-octafluorobutane, tetrafluorodimethyl ether, perfluorodiethyl ether, 1,1-difluorodimethyl ethers, etc. Mixtures of such refrigerants are also suitable. Those fluorocarbon refrigerants which have a boiling point below 15° C., such as $CClF_2$—$CClF_2$, are preferred. Other inert vaporizable components and refrigerants which satisfy the boiling point and vapor pressure requirements described above are suitable and are considered within the scope of this invention.

In order that those skilled in the art will be better able to practice the present invention, the following example is given by way of illustration to demonstrate the rapid rise in the heat generation rate per unit phosgene. There are numerous means by which this increase can be detected and it is not intended to limit this invention to the embodiment described.

EXAMPLE 1

A 2-liter Morton flask was charged with bisphenol A (BPA) (114.14 g; 0.50 mol), methylene chloride (400 ml.), and Freon 114 ($CFCl_2CFCl_2$; 100 ml.) and was fitted with a chilled spiral condenser (condenser temp=6° C.), mechanical stirrer, thermometer, pH meter, NaOH addition funnel, and phosgene bubbler. The reaction was vented to a liquid nitrogen-cooled trap. Phosgene was bubbled through the rapidly stirred mixture at a rate of about 2.0 gm./min. Aqueous NaOH (5M) was added concurrently at such a rate as to maintain the pH in the range of 2-5. The reaction temperature increased from 8° C. at the start of reaction to 15° C. within 4 minutes after which a temperature of 15-20° C. was maintained by keeping the dual solvent system at reflux. Some of the refrigerant was permitted to escape the system at the endpoint of the reaction, which allowed the rate of heat generation by the reaction mixture to be monitored with the thermometer. A summary of time and temperature data is indicated in Table I.

TABLE I

| Preparation of BPA-Bischloroformate | | | | |
|---|---|---|---|---|
| Time (min) | Temp (°C.) | pH | Δ/10 min | Comments |
| 10.0 | 17 | 3.3 | — | steady reflux |
| 15.5 | 17 | 3.0 | — | |
| 20 | 18 | 3.5 | 1° C. | |
| 27.5 | 19 | 4.5 | — | |
| 28.5 | 20 | 2.0 | — | |
| 29.5 | 20 | 2.0 | 2° C. | |
| 31 | 21 | 1.9 | — | |
| 35 | 21 | 3.0 | — | BPA present, steady reflux |
| 40 | 21 | 2.4 | 1° C. | |
| 45 | 21 | 4.1 | — | |
| 49.5 | 23 | 1.8 | 2° C. | |
| 51 | 24 | 4.8 | — | v. slight BPA present |
| 52 | 25 | 3.5 | — | BPA gone |
| 55 | 28 | 3.5 | 10° C. | reaction terminated |

The temperature began to rise quickly after 50 minutes (ΔT/10 min.=10° C.), indicating the end point of reaction. When the temperature reached 28° C., the flow of phosgene was terminated. The reaction was quenched by sparging with nitrogen for 30 minutes (to remove any excess phosgene). The methylene chloride layer was washed with water and 1M HCl and endcapped by the addition of an equimolar mixture of phenol and triethylamine. A 2-ml. sample was removed for hplc analysis. Inspection of the liquid nitrogen trap indicated that 15 ml. of solvent had escaped the reactor.

Hplc analysis of the reaction product indicated 67% BPA-bischloroformate, 16% dimer bischloroformate, 5% trimer bischloroformate, and 2% tetramer bischloroformate. In addition, 4% bisphenol monochloroformate was formed.

As shown in Table I, the rapid rise in temperature signaled the consumption of all BPA, i.e., the end point of the reaction.

Modifications of the above embodiment will be obvious to those skilled in the art and are considered to be within the scope of this invention.

What is claimed is:

1. A method for detecting the end point of the reaction between phosgene and an organohydroxy compound under interfacial polycondensation reaction conditions comprising monitoring the rate of heat generated during th course of the polycondensation reaction until a rapid rise in heat generated, per unit of phosgene added, is detected at about the stoichiometric end point of the reaction conducted in a mixture comprising an aqueous solution which contains a member of the group consisting of alkali metal hydroxides and alkaline earth metal hydroxides and organic solvent in which phosgene is soluble.

2. A method as in claim 1 wherein the organic solvent comprises methylene chloride, the organohydroxy compound is a dihydric phenol and the aqueous solution contains a member of the group consisting of NaOH and $Ca(OH)_2$.

3. A method as in claim 1 wherein the organohydroxy compound is of the formula $R^2(OH)_x$, wherein $R^2$ is an aromatic, aliphatic or alicyclic radical and x is at least 1.

4. A method as in claim 3 wherein the reaction between phosgene and the organo-hydroxy compound of the formula $R(OH)_x$ is an interfacial reaction which produces bishloroformates having the formula

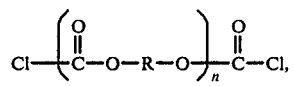

[I]

and monochloroformates having the formula

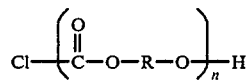

[II]

wherein R is a divalent aromatic, aliphatic or allylcyclic radical and n is at.least 1.

5. A method as in claim 4 wherein the organohydroxy compound is bisphenol A.

6. A method as in claim 1 wherein the reaction mixture is below reflux and the increase in the rate of heat generated by said reaction mixture per unit phosgene is determined by measuring the temperature increase of said reaction mixture.

7. A method as in claim 1 wherein the reaction mixture is at reflux and the increase in the rate of heat generated by said reaction mixture per unit of phosgene is determined by measuring the increase in solvent vaporization from said reaction mixture.

8. A method as in claim 7 wherein the vapors are condensed within a condenser and the increase in solvent vaporization is determined by measuring the velocity of vapors through the condenser.

9. A method as in claim 7 wherein the vapors are condensed within a condenser and the increase in solvent vaporization is determined by monitoring the position of the vapor/condensate interface within the condenser.

10. A method as in claim 1 wherein the organic solvent solution comprises at least 2 vaporizable components at reflux having different vaporization temperatures.

11. A method as in claim 10 wherein the organic solvent solution comprises methylene chloride and an inert fluorocarbon refrigerant selected from the group consisting of fluorinated carbon compounds of from 4 to 5 carbon atoms, fluorinated ethers of from 2 to 4 carbon atoms, $CHCl_2F$, $CCl_3F$, $CClF_2$—$CClF_2$, $CCl_2F$—$CF_3$, $CH_2Cl$—$CF_3$, $CH_3$—$ClF_2$, $CBrClF_2$, $CF_2I$—$CF_3$ and $CHClF$—$CClF_2$.

12. A method as in claim 11 wherein the perfluorinated carbon compounds are selected from the group consisting of n-perfluorobutane, perfluoroisobutane and cyclicoctafluorobutane; and the fluorinated ethers are selected from the group consisting of tetrafluorodimethyl ether, monofluorodimethyl ether, perfluorodiethyl ether, and 1,1-difluorodimethyl ether.

13. A method as in claim 10 wherein the vapors of at least one component of the organic solvent solution escape the reaction mixture and the increase in the rate of heat generated by said reaction mixture per unit of phosgene is determined by monitoring the increase in temperature of the vapors or the reaction mixture.

* * * * *